UNITED STATES PATENT OFFICE.

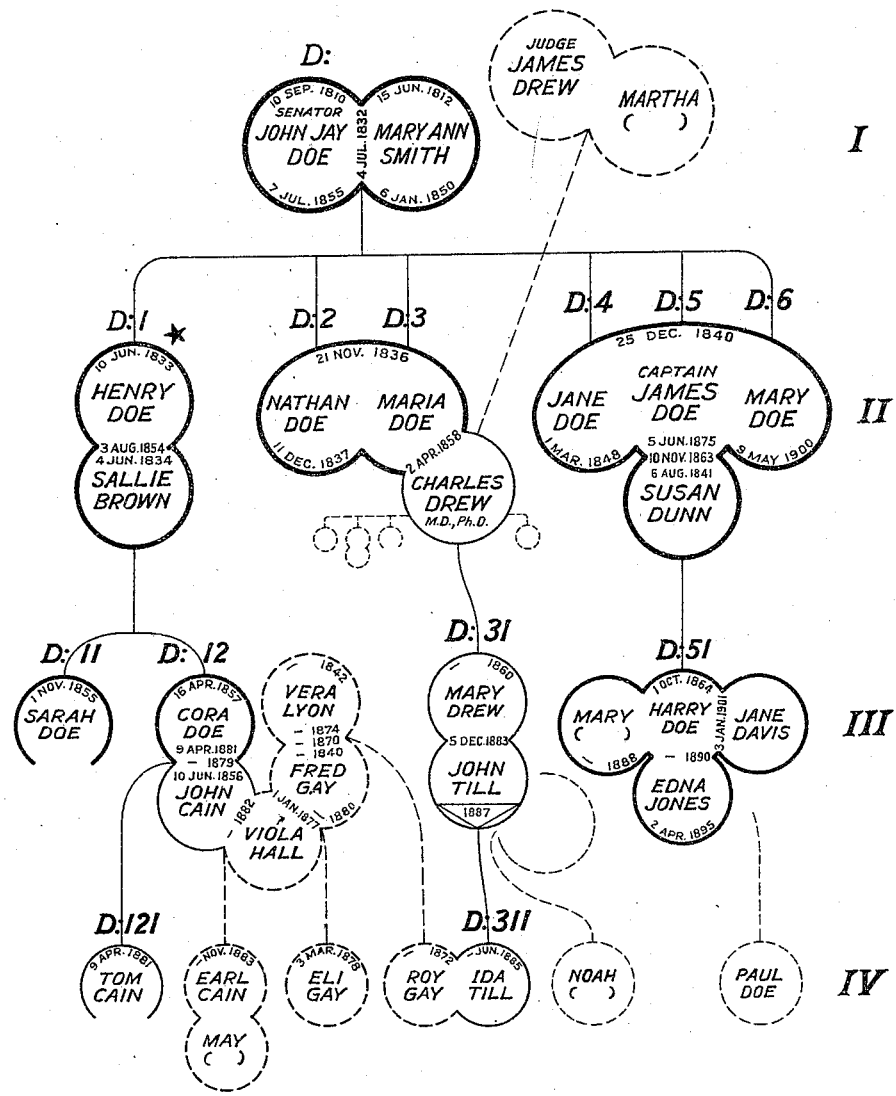

HERMAN S. DAVIS, OF PITTSBURGH, PENNSYLVANIA.

GENEALOGICAL CHART.

1,297,663.  Specification of Letters Patent.  Patented Mar. 18, 1919.

Application filed December 17, 1918. Serial No. 267,105.

*To all whom it may concern:*

Be it known that I, HERMAN S. DAVIS, a citizen of the United States, residing at 4323 Andover Terrace, in the city of Pittsburgh, county of Allegheny, and State of Pennsylvania, have invented new and useful Improvements in Genealogical Charts, of which the following is a specification.

The present invention relates to improvements in genealogical charts or means used for showing the lineage of individuals, whether human or animal: meaning thereby the blood, collateral and allied relationships of ancestors and descendants, and any and all other forms of kinship or relationship by blood, marriage or affinity.

The accompanying drawing is an illustration of a chart constructed in accordance with the present invention. It illustrates a genealogical history covering four generations and, as will be hereinafter more particularly pointed out, provides means for determining at a glance the direct line of descent, or course of the primary stock through the several generations, as well as additions thereto from other families.

In constructing a chart according to the present invention, a suitable figure, geometrical or other, is selected to represent an individual, and by various groupings, combinations, shadings, shapes of outline, or color, relationships between different individuals of the same family or of allied families are clearly depicted.

When the genealogical chart is drawn or printed on paper or other suitable material for representation on a plane surface in preference to being represented by disks or other means hereinafter referred to, the circle has been found particularly well adapted as the figure to represent the individual, being perhaps the simplest for such purpose. Therefore the circle is employed in this drawing to illustrate the ideas involved in my invention.

Referring to the drawing it will be seen that:

A date placed at the top of the circle and within it denotes date of birth: a date placed at the bottom of the circle and within it denotes date of death:

Marriage is denoted by the confluence or intersection of the two circles which represent the husband and the wife respectively, and a date placed along the chord common to the two confluent circles denotes the date of marriage:

Multiple marriages, being two or more marriages by the same individual, are shown by that individual's circle having two or more other circles intersecting it, one for each mate, as is illustrated by the three wives of Harry Doe in the drawing at D:51:

Successive marriages are shown in sequence, as illustrated in the group of five circles at D:12 in the drawing, where Fred Gay is shown to have had Vera Lyon for his first wife and for his second wife Viola Hall who, after Fred Gay's death, became the second wife of John Cain subsequent to the death of his first wife Cora Doe. In this group Cora Doe is the only one belonging to the primary family whose genealogy is being charted; therefore her circle is made with a heavy line; whereas her husband, introducing into this primary family a new surname, is represented by a circle of lighter line, and the three other members of this group, because they have no relationship whatever to the primary family, are represented by circles of dotted or colored lines:

Intermarriage between individuals of collateral lines is indicated by junction of the two circles representing said individuals, as illustrated by an analogous case at D:311 (Roy Gay and Ida Till):

Illegal union is depicted by not opening the circle of the male between the points of confluence nor quite joining the circle of the female to the circle of the male; and both the extraneous mate and a spurious or bastard child resulting from such union are represented by circles of dotted or colored lines as aforespecified in the case of individuals not related to the primary family: these ideas are illustrated in the drawing in connection with John Till and his child Noah:

Divorce is indicated by a triangle in the lower part of the circle of that individual who, by reason of the divorce, is separated from the primary family whose chart is being constructed; the date within the triangle being the date of the decree of divorce; see John Till at D:31:

The first and middle names of the individual are placed within his circle, preferably in a single straight line, and the surname in a lone line of lettering beneath constitutes a lone line of lettering beneath the first and middle names; if the circle represents a female the maiden name is the one preferred since other data on the chart will reveal her new surname after marriage: titles of profession, honor or rank, may be placed either above or below the name as may be best adapted to the style of title to be inserted:

Multiple births, such as twins, triplets, etc., are indicated by merging the tops of the circles representing the individuals into a common arc to denote their common date of birth, while the lower part of the circles retain their individuality, as is shown in the drawing at D:2 and D:3 for twins and at D:4 and D:5 and D:6 for triplets.

A circle left open (as Sarah Doe at D:11) indicates that the individual is not known to be dead at the date the chart is made because it signifies possibility of future marriage; whereas, if the circle is completed (as Eli Gay) the signification is that the individual is known to be dead even though the date, not being known, cannot be inserted:

Referring to the drawing it will be further seen that:

All circles representing individuals in a given generation are made to lie along the same general horizontal zone, though the family groups of that generation may be clustered in any form, rectilinear, curved, arched or other shape best adapted to give artistic effect or to conserve horizontal space:

The members of each family are connected to the confluent circles denoting the parents by a line of any shape best designed to fit the grouping adopted for that particular family cluster and to make a visible bond between parents and children; and the children are arranged strictly according to the order of their birth:

If either parent was married more than once, said bond is drawn to the proper point of confluence to indicate beyond doubt from which marriage said issue proceeded; but otherwise it is not material that this bond should be drawn to the point of confluence of the two circles representing the parents, since these circles may lie in either a vertical or oblique as well as horizontal position as clearly shown on the drawing, in which case the bond from child to parents may intersect the circle of either parent and at any point on the circle:

Legal adoption of a child is indicated by not making a complete junction between the child and the head of the family into which the child has been adopted; this is illustrated in the drawing by Paul Doe adopted by Harry Doe, D: 51:

The generations are numbered, from the earliest ancestor known, with Roman numerals in the right hand margin in this drawing; but the generation of the different individuals is graphically further shown by having the circles in different generations of different diameter to denote the order of the generation, the earliest generation having the largest circles and the latest generation the smallest, the gradation being adjusted to suit the size of chart to be made and number of individuals to be represented; but this gradation, once adopted, is maintained throughout all charts in the series so that if two individuals of different generations marry, that fact will be shown by the confluence of two circles of different diameters:

When new blood has married into the primary family and it is desired to depict the new individual's order in his (or her) own family group, this is done by use of miniature circles merely outlining existence of brothers and sisters and such other relations as are to be shown, if there is neither space nor desire to insert them with dotted lines in normal size and lettered; thus Charles Drew, husband of D: 3, is shown in the drawing to be the fourth child of Judge James Drew, and it is moreover shown that, of his brothers and sisters, one is married and one is unmarried though still living and that the other two are known to be dead before marrying:

Each individual named on the chart who has been liberal in contributing information and family records for the compiling of the family's genealogical history can, if desired, be marked in some distinctive way as permanent evidence thereof, as by a star on Henry Doe at D: 1:

While the present drawing is an embodiment of the invention to depict the genealogical history of a family by using only circles and combinations of circles for both males and females, rhomboids, squares or any other regular or irregular figures might be similarly used; or a sharper distinction between males and females, than by name alone, might be made by using a circle for the one and a square, say, for the other and still leave my symbolism available to denote order of generation, marriage, plural birth, etc. And there are still other methods: for instance, the portrait of one or more individuals might be used; or if portraits are not universally available, living individuals might be represented by portraits and dead ones by photographs of their tombstones with the inscriptions; or any composite of these pictures with circles or other figures would still leave practicable the utilization of all the symbolism above stated and described.

Also, not alone may these be used upon a sheet of material suitable for drawing or printing, but charts embodying the features hereinbefore described may be constructed in a different manner; for instance, the figures representing individuals might be formed from blocks or disks of any suitable material, the several groups and individuals being properly connected by rods or bonds and the whole suspended from the earliest ancestors, the shapes, sizes and positions of the various blocks or disks, as before explained, denoting the particular relationships.

Having thus described the invention, what is claimed is:

1. A genealogical chart comprising a series of figures, each representing an individual, the figures corresponding to individuals of the same generation being of uniform dimensions, arranged in substantially the same horizontal line and of a size different from the figures representing individuals in earlier or later generations; with a series of bonds uniting appropriate figures in different generation groups and representing lines of descent.

2. A genealogical chart comprising a series of figures, each representing an individual, marriage being represented by the intersection of two of the said figures and plural births by a composite figure formed by grouping the proper number of individual figures so that corresponding portions of the outline of each are merged into a common boundary while the remainder of each individual outline is maintaned.

3. A genealogical chart comprising a series of figures, each representing an individual, said figures being arranged in groups indicating families and generations, with connections between figures in different generation groups representing lines of descent; the figures representing individuals of the primary blood or those assuming the surname of that family having an outline of greater breadth than those representing individuals of a different male blood marrying into the primary family and thereby introducing a new surname.

4. A genealogical chart comprising a series of figures, each representing an individual, said figures being arranged in groups indicating families and generations, the figures corresponding to individuals of the same generation being of uniform size, arranged in substantially the same horizontal zone but of a size different from the figures representing individuals in earlier or later generations, with connections between figures in different generation groups representing lines of descent; the figures representing individuals of the primary blood or those assuming the surname of that family having an outline heavier or of greater breadth than those representing individuals of a different male blood marrying into the primary family and thereby introducing a new surname.

5. A genealogical chart comprising a series of circle-like figures, each representing an individual, marriage being represented by the intersection of two of such figures and plural births by merging portions of the circles representing the individuals into a common arc, the figures representing individuals in the same generation being in substantially the same horizontal line or zone, with connections representing lines of descent extending from one generation group to another.

6. A genealogical chart comprising a series of circle-like figures, each representing an individual, all the figures indicating individuals of a particular generation being of the same diameter and of a size different from those indicating individuals of earlier or later generations, marriage being represented by the intersection or confluence of two such figures and an incomplete circle representing a living, unmarried individual, while a complete circle indicates that the individual represented thereby has died, and lines representing lines of descent extending from one generation group to another, the outlines of the circles which represent individuals of the primary blood, as well as the lines of descent from such individuals in one generation group to those in another being of a different character from the figures representing individuals who do not bear kinship to members of the primary stock.

In testimony whereof I have hereunto set my hand in presence of two subscribing witnesses.

HERMAN S. DAVIS.

Witnesses:
J. K. CROWNOVER,
GEORGE H. TABER.